Patented Oct. 27, 1953

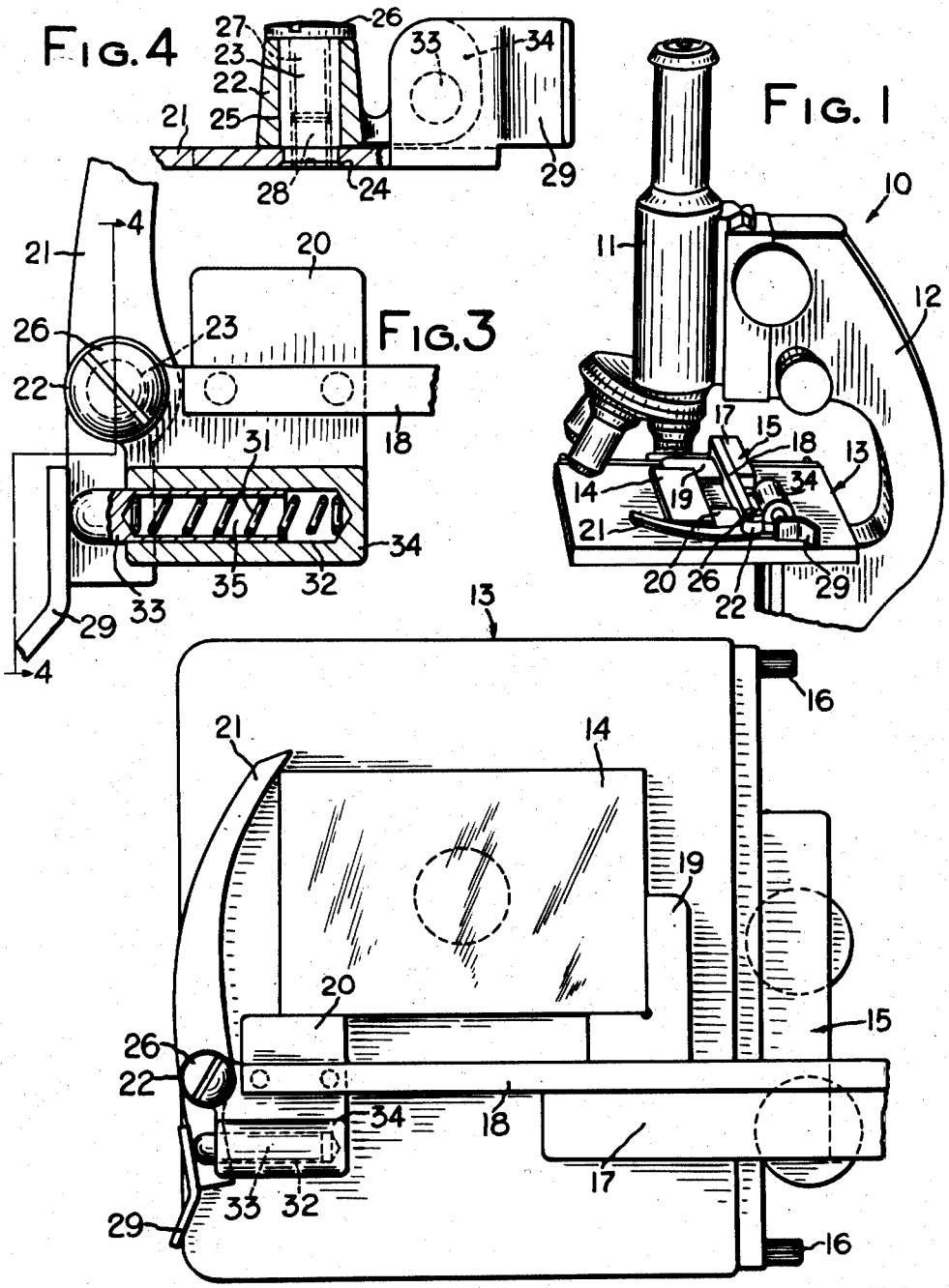

2,656,760

UNITED STATES PATENT OFFICE 2,656,760

SLIDE CLAMPING MECHANISM FOR MECHANICAL STAGES FOR MICROSCOPES

Clarence J. Bowerman, Pittsford, N. Y., assignor to Bausch & Lomb Optical Company, Rochester, N. Y., a corporation of New York Application July 8, 1950, Serial No. 172,711

2 Claims. (Cl. 88—40)

1

This invention relates to a mechanical stage for microscopes and more particularly to the slide clamping mechanism.

Mechanical stages are commonly constructed with a spring-actuated clamping finger, which holds a specimen slide against the mechanical stage, and such a mechanism serves to facilitate rapid operation of said stage. When using such a clamping finger in attaching a slide to the mechanical stage, the microscopist must be careful to release the clamping finger rather slowly so that it will come to rest against the slide without a destructive blow. Often, due to careless handling, the clamping finger is snapped by the uncontrolled spring against the slide with such force that a corner or edge of the slide is chipped or broken.

In view of the above-mentioned difficulty, it is an object of this invention to provide a mechanical stage having novel means for retarding the action of a clamping device for the specimen slide.

Another object is to provide such a device in which the clamping mechanism for the slide is retarded in its clamping action by fluid pressure-responsive mechanism.

It is a further object to provide such a device which is simple in form and reliable in operation and is inexpensive to manufacture and service.

Further objects and advantages will be found in the novel details of construction and combination of parts as described in the following specification and shown in the accompanying drawing in which:

Fig. 1 is a general perspective view, drawn to a small scale and partly broken away, of a microscope embodying a preferred form of my invention, Fig. 2 is an enlarged top view of the stage mechanism shown in Fig. 1, Fig. 3 is an enlarged top view, partly in section and with some parts broken away, of parts of the clamping mechanism for the slide, and Fig. 4 is a side view taken on the line 4—4 of Fig. 3 and having some parts broken away and shown in section.

A microscope 10 is partially shown in Fig. 1, comprising a body tube 11 mounted on an arm 12 to which is also attached a stage 13 whereon a specimen slide 14 is held for examination. To selectively position the slide 14 beneath the tube 11, a mechanical stage of conventional form, generally indicated at 15, is provided. The mechanical stage 15 is attached to stage 13 by

2 suitable means, such as the thumb screws 16 (Fig. 2), which extend through the ends of a frame or chassis structure 17 which partly overlies the stage 13. Said frame comprises a movable rail 18 to which is suitably fixed an L-shaped locater block 19 and a locater pad 20 against which the slide 14 is secured by a clamping finger 21 located substantially coplanar with the slide and pivoted in a boss 22 on the end of rail 18 so that it may engage an outer corner of the slide. As best shown in Fig. 4, finger 21 has an upright pivot stud 23 which is fixed thereto by suitable means such as riveting at 24 and which is rotatably fitted into a bore 25 in boss 22. A cap screw 26 is threaded into a tapped hole 27 in the upper end of stud 23 to hold the finger assembled in the boss 22 and a lock screw 28 for the cap screw is threaded into the tapped hole 27 at the lower end of the stud. The finger 21 is manually operated by an upstanding tab 29 which is suitably formed on the short end thereof, preferably by bending up an extension on the side of the finger. The finger 21 is biased toward the slide 14 by a compression spring 31 which is supported on the rail 18 and is operatively connected at its outer end with the tab 29 so as to apply clamping power to the finger as will be hereinafter described.

According to this invention, retarding means are provided to slow down the clamping movement of the clamping finger 21 so that the spring 31 will not have free action in swinging said finger. This means comprises a cylindrical bore 32 in which a piston 33 is fitted to form a dashpot. In the preferred form of this invention, the bore 32 is located in a boss 34 which is fixed to one side of the free end of rail 18. One end of spring 31 is seated in the bottom of the bore 32, and the other end is seated in a hole 35 formed in the inner end of the piston 33 so that the spring is partially housed therein. Expansion of the spring 31 causes the rounded head of the piston 33 to push against the tab 29 whereby the clamping finger 21 is biased into contact with slide 14.

The dashpot action of piston 33 may be secured in several ways, but in the preferred form of the invention, it is important that the amount of effective clearance between the piston 33 and cylinder 32 be closely specified for obtaining such action. This clearance should be great enough to allow the air, that is compressed beneath the piston 33 on its inward stroke, to escape along the wall of the piston during the time interval in which the slide 14 is being placed in position on the stage, but said clearance should also be small enough to cause a momentary negative air pressure to form beneath the piston as it moves outwardly. The suction thus produced in the cylinder 32 should be sufficient to effectively retard outward motion of piston 33. I have discovered that, for dry operation of the piston 33, the difference between the diameters of piston 33 and bore 32 should be substantially ½% to 2% of the diameter of the piston. For any greater clearance than the above-mentioned, a lubricant must be used on the piston to seal the air space so as to obtain satisfactory operation. Such an expedient is unsatisfactory because the lubricant wears off, drys out, or becomes clogged with dust particles so that the operation of the piston is erratic and unpredictable and requires much attention. Therefore, dry operation of the piston 33 is far preferable.

Customary procedures are used when operating the above-described structure. The finger 21 is first swung to the left, in Fig. 2, by manually moving the tab 29 to the right. This pushes the piston 33 into the bore 32, thus compressing the spring 31 and building up positive air pressure momentarily behind the piston. The slide 14 is placed on the stage 13 against the locating elements 19 and 20 while the tab 29 is held depressed and, during this brief interval of time, the pressurized air beneath the piston 33 escapes along the wall of the piston. Immediately after placing slide 14 on stage 13, the tab 29 is released and the clamping finger comes to rest with a retarded motion against the corner of slide 14, the resulting impact of the finger 21 against the slide 14 being so small that no chipping will occur. Even the most sudden release of the clamping finger will not cause injury to the slide.

Although only a preferred form of my invention has been shown and described in detail, it will be understood that various other forms are possible, and substitutions, modifications and rearrangement of its parts may be made without departing from the spirit of this invention as defined in the appended claims.

I claim:

1. A mechanical stage for a microscope comprising a frame for positioning a specimen slide on the microscope stage, a clamping finger mounted to turn on a pivot carried by the frame, the pivot being located adjacent one end of the finger to divide the finger into long and short end portions, the long end portion of the finger extending away from the frame to engage the slide, a piston slidably mounted in a bore formed in the frame, and a spring mounted within the bore and normally urging the piston outwardly into contact with the short end portion of the finger to urge the long end portion of the finger into clamping engagement with the slide, the diameter of the piston being less than that of the bore whereby a clearance is provided for the passage of air, said clearance being the only means permitting flow of air into or out of the bore, the clearance between the piston and bore being such as to permit slow escape of air from the bore when the piston is moved inwardly against the action of the spring and to permit the slow inflow of air into the bore when the piston is moved outwardly by the action of the spring whereby the movement of the finger against the slide is retarded.

2. The structure defined in claim 1 wherein the diameter of the piston is about ½%–2% less than the diameter of the bore.

CLARENCE J. BOWERMAN.

References Cited in the file of this patent

UNITED STATES PATENTS

| Number | Name | Date |
|---|---|---|
| 536,552 | Swift | Mar. 26, 1895 |
| 588,689 | Bausch | Aug. 24, 1897 |
| 1,640,716 | Mulder | Aug. 30, 1927 |
| 1,908,053 | Rigler | May 9, 1933 |

FOREIGN PATENTS

| Number | Country | Date |
|---|---|---|
| 2,912 | Great Britain | of 1857 |